United States Patent [19]

Eriksson et al.

[11] Patent Number: 5,960,076
[45] Date of Patent: Sep. 28, 1999

[54] METHOD AND APPARATUS FOR DETERMINING THE DEVIATION OF LONGITUDINAL SIGNAL COMPONENTS FROM A PREDETERMINED VALUE

[75] Inventors: Hans Oskar Eriksson, Järfälla; Elisabeth Maria Larsson, Bromma; Henrik Hellberg, Solna; Carl-Henrik Jörgen Malmgren, Stockholm, all of Sweden

[73] Assignee: Telefonaktiebolaget LM Ericsson, Stockholm, Sweden

[21] Appl. No.: 08/809,681

[22] PCT Filed: Sep. 18, 1995

[86] PCT No.: PCT/SE95/01052

§ 371 Date: Mar. 19, 1997

§ 102(e) Date: Mar. 19, 1997

[87] PCT Pub. No.: WO96/09711

PCT Pub. Date: Mar. 28, 1996

[30] Foreign Application Priority Data

Sep. 20, 1994 [SE] Sweden .................................. 9403152

[51] Int. Cl.⁶ ........................................................ H04M 1/00
[52] U.S. Cl. ........................... 379/399; 379/398; 379/413
[58] Field of Search .................................... 379/387, 398, 379/399, 400, 413

[56] References Cited

U.S. PATENT DOCUMENTS 4,852,162 7/1989 Taya et al. ............................. 379/413
4,910,768 3/1990 Sue et al. ............................... 379/394
5,347,577 9/1994 Takato et al. ........................... 379/413

FOREIGN PATENT DOCUMENTS 2 199 719  7/1988  United Kingdom .

OTHER PUBLICATIONS

Basic Engineering Circuit Analysis, 3rd Edition By J. David Irwin pp. 126–127, 1990.

IEEE Standary Dictionary of Electrical And Electronic Term, Sixth Edition, IEEE STD. 100–1996 pp.181, & 603.

*Primary Examiner*—N. Le
*Assistant Examiner*—Shih-Wen Hsieh
*Attorney, Agent, or Firm*—Burns, Doane, Swecker & Mathis, L.L.P.

[57] ABSTRACT

To determine the deviation of longitudinal signal components from a predetermined value on a balanced two-wire circuit (A,B), a first voltage is measured between one of the wires (A) and a first reference potential by means of a first voltage measuring means (3), a second voltage is measured between the second wire (B) and a second reference potential by means of a second voltage measuring means (4), and the difference between the first and the second voltage is formed by means of a difference forming means (5), said difference being proportional to the deviation of the longitudinal signal components from the mean value of the first and the second reference potential.

4 Claims, 1 Drawing Sheet

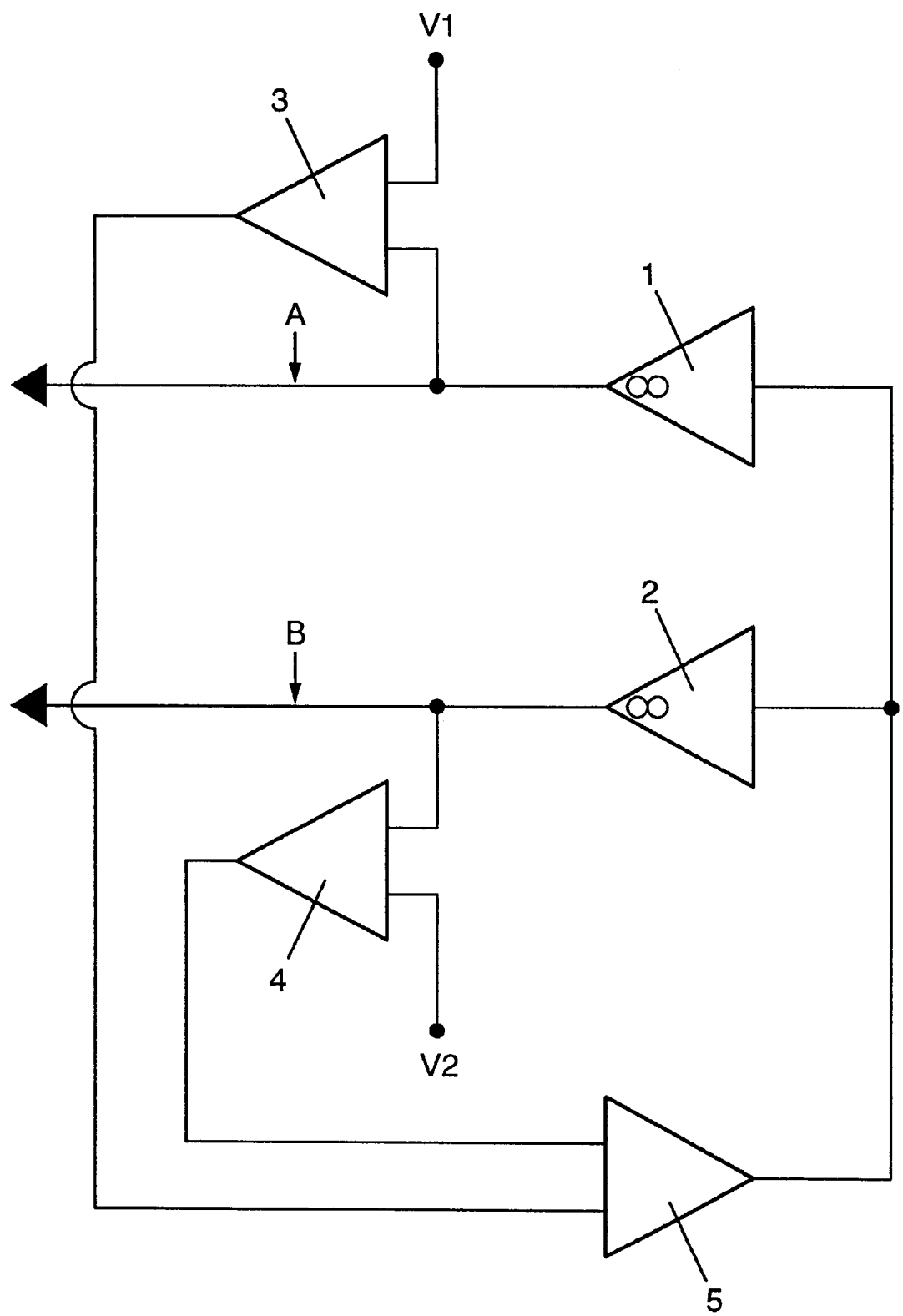

METHOD AND APPARATUS FOR DETERMINING THE DEVIATION OF LONGITUDINAL SIGNAL COMPONENTS FROM A PREDETERMINED VALUE

DESCRIPTION

1. Technical Field

The present invention relates to a method and to an arrangement for determining the deviation of a longitudinal signal component from a predetermined value on a balanced two-wire conductor.

2. Description of the Background Art

Subscriber apparatus are connected to switching centres by means of balanced two-wire conductors, so-called subscriber lines, each of which is connected in the switching centres to a respective subscriber line circuit in the form of a semi-conductor chip.

One function of the subscriber line circuit is to supply direct current to the subscriber line. The resultant voltage on the subscriber line is therewith load-dependent, i.e. subscriber apparatus dependent. In this regard, it is important that the mean value of the potentials on the signal conductors is kept constant. This is achieved traditionally, by maintaining the centre point between the two signal conductors at constant potential.

This is normally achieved by connecting over the subscriber line a voltage divider which includes two resistors of mutually the same size, so as to be able to detect the potential at the subscriber-line centre point. The potential obtained between the resistors in the voltage divider is compared with a reference value, which in turn is determined by a voltage divider between earth and the supply voltage of the subscriber line circuit. The measured difference is then allowed to activate the final stage of the subscriber circuit longitudinally. This feedback system forms the so-called longitudinal loop.

In a telephone switching centre, the subscriber lines are mostly at rest, i.e. the lines are open for most of the time. However, when the potential at the midway point of the subscriber line is detected with the aid of a voltage divider that has two resistors of mutually equal size in accordance with the aforesaid conventional method, the power loss in the resistors is greatest in the case of an open subscriber line. If the resistance values of the two resistors are increased in order to reduce power loss, it is necessary to increase the size of the chip. Thus, this known method always requires relatively wide surface demanding resistors. Although these resistors occupy a significant part of the surface of the subscriber line circuit, their contribution to the power loss when the lines are at rest is also significant.

SUMMARY OF THE INVENTION

Accordingly, the object of the present invention is to reduce the power loss in the subscriber line circuits at rest, and therewith reduce the total power loss in the telephone switching centre.

This object is achieved in accordance with the inventive method by measuring a first voltage between one wire and a first reference potential, by measuring a second voltage between the second wire and a second reference potential, and by determining the difference between the first and the second voltage values, this difference being proportional to the deviation of the longitudinal signal components from the mean value of the first and the second reference potentials.

The object is also achieved with the inventive arrangement, which includes a first voltage measuring means which functions to measure a first voltage between one wire and a first reference potential, a second voltage measuring means which functions to measure a second voltage between the other wire and a second reference potential, and a difference forming means which functions to form the difference between the first and the second voltages, this difference being proportional to the deviation of the longitudinal signal components from the mean value of the first and the second reference potentials.

BRIEF DESCRIPTION OF THE DRAWING

The invention will now be described in more detail with reference to an exemplifying embodiment of an inventive arrangement and also with reference to the accompanying drawing.

BEST MODE OF CARRYING OUT THE INVENTION

The reference numerals 1 and 2 identify the two final stages in a subscriber line circuit (not shown in detail) for supplying electric current to a subscriber apparatus (not shown) via the two wires A and B of a balanced two-wire circuit.

In this case, the final stage 1 supplies the wire A and the final stage 2 supplies the wire B.

Current is supplied to the subscriber line circuit, not shown in detail, from a battery (not shown) having terminals V1 and V2, the terminal V1 normally lying on earth potential and the terminal V2 normally lying on −48V.

According to the invention, the mean value of the potentials on the wires A and B is held constant by measuring the voltage between the wire A and the terminal V1 with the aid of a voltage measuring means 3, for instance a differential amplifier, and by measuring the voltage between the wire B and the terminal V2 with the aid of a voltage measuring means 4, which may also be comprised of a differential amplifier.

The difference between the voltage measured by the voltage measuring means 3 and the voltage measured by the voltage measuring means 4 is generated or formed by a difference-forming means 5, which may also be a differential amplifier.

The difference formed by the difference forming means 5 is proportional to the deviation of the longitudinal signal components from the mean value of the voltage between the terminals V1 and V2 and is therefore used to activate the final stages 1 and 2.

When the two-wire circuit is at rest, i.e. when the subscriber circuit is open, the voltage between the wire A and the terminal V1 and the voltage between the wire B and the terminal V2 will be much lower than the voltage between the wires A and B. Distinct from the traditional method of detecting the deviation of the longitudinal signal components from a predetermined value, the power loss in the case of open subscriber lines will be much lower in the case of the inventive arrangement.

We claim:

1. A method of determining the deviation of longitudinal signal components from a predetermined value on a balanced two-wire line comprising:

measuring a first voltage between one wire and a first reference potential;

measuring a second voltage between the other wire and a second reference potential; and determining the difference between the first and the second voltage, said difference being proportional to the deviation of the longitudinal signal components from the mean value of the first and the second reference potential.

2. An arrangement for determining the deviation of longitudinal signal components from a predetermined value on a balance two-wire circuit comprising:

a first voltage measuring means which functions to measure a first voltage between one wire and a first reference potential;

a second voltage measuring means which functions to measure a second voltage between the other wire and a second reference potential; and a difference forming means which functions to form the difference between the first and the second voltages, this difference being proportional to the deviation of said longitudinal signal components from the mean value of the first and the second reference potentials.

3. An arrangement according to claim 2, characterized in that the first voltage measuring means, the second voltage measuring means, and the difference forming means are differential amplifiers.

4. An apparatus for determining the deviation of longitudinal signal components from a predetermined value on a balanced two-wire circuit comprising:

a first differential amplifier that measures a first voltage between a first wire and a first reference potential;

a second differential amplifier that measures a second voltage between a second wire and a second reference potential; and a third differential amplifier that outputs a difference between the first and the second voltages, wherein the deviation of said longitudinal signal components from the mean value of the first and the second reference potentials is proportional to said difference.

* * * * *